United States Patent [19]

Coleman et al.

[11] Patent Number: 5,527,151
[45] Date of Patent: Jun. 18, 1996

[54] ADVANCED WIND TURBINE WITH LIFT-DESTROYING AILERON FOR SHUTDOWN

[75] Inventors: Clint Coleman; Theresa M. Juengst, both of Warren, Vt.; Michael D. Zuteck, Kemah, Tex.

[73] Assignee: Northern Power Systems, Inc., Moretown, Vt.

[21] Appl. No.: 206,082

[22] Filed: Mar. 4, 1992

Related U.S. Application Data

[63] Continuation-in-part of Ser. No. 206,867, Mar. 4, 1994.

[51] Int. Cl.$^6$ .................................................. F01D 5/00
[52] U.S. Cl. ................... 416/23; 416/24; 244/215
[58] Field of Search .................. 416/23, 24; 244/130, 244/213, 215, 216

[56] References Cited

U.S. PATENT DOCUMENTS

| | | | |
|---|---|---|---|
| 2,493,041 | 1/1950 | Stalker | 416/90 A |
| 2,617,487 | 11/1952 | Stalker | 170/135.4 |
| 2,622,686 | 12/1952 | Chevreau et al. | 170/66 |
| 3,128,966 | 4/1964 | Alvarez-Calderon | 244/42 |
| 3,478,987 | 11/1969 | Dorand | 244/17.25 |
| 3,915,414 | 10/1975 | Shoulders | 416/20 R |
| 4,025,230 | 5/1977 | Kastan | 416/18 |
| 4,181,275 | 1/1980 | Moelter et al. | 244/213 |
| 4,286,922 | 9/1981 | Lew | 416/17 |
| 4,297,076 | 10/1981 | Donham et al. | 416/37 |
| 4,349,169 | 9/1982 | McAnally | 244/219 |
| 4,445,421 | 5/1984 | Walker et al. | 91/186 |
| 4,460,138 | 7/1984 | Sankrithi | 244/215 |
| 4,462,753 | 7/1984 | Harner et al. | 416/48 |
| 5,110,072 | 5/1992 | Owl et al. | 244/213 |
| 5,161,757 | 11/1992 | Large | 244/216 |
| 5,335,886 | 8/1994 | Greenhalgh | 244/213 |

FOREIGN PATENT DOCUMENTS

| | | | |
|---|---|---|---|
| 951186 | 10/1949 | France | 416/23 |
| 741304 | 9/1943 | Germany | 416/23 |
| 49585 | 4/1980 | Japan | 416/23 |
| 136581 | 8/1984 | Japan | 416/24 |
| 558045 | 12/1943 | United Kingdom . | |
| 637669 | 5/1950 | United Kingdom | 416/23 |

OTHER PUBLICATIONS

Snyder, M. N. et al., "Additional Reflection Plane Tests of Control Devices on an NACA 23024 Airfoil", Wind Energy Report No. 26, Wichita State University, Feb., 1985, pp. 1–44.

Miller et al., "Shutdown Characteristics of the Mod-O Wind Turbine with Aileron Controls", NASA, Lewis Research Center, DOE NASA/20320-61, NASA TM-8691, Cleveland, OH, May 1984.

Snyder et al., "Reflection Plane Test of Control Devices on a Thick Airfoil at High Angles of Attack", Wind Energy Report No. 23 revised, Lewis Research Center, Oct. 1984.

(List continued on next page.)

*Primary Examiner*—John T. Kwon
*Attorney, Agent, or Firm*—Fish & Richardson

[57] ABSTRACT

An advanced aileron configuration for wind turbine rotors featuring an aileron with a bottom surface that slopes upwardly at an angle toward the nose region of the aileron. The aileron rotates about a center of rotation which is located within the envelope of the aileron, but does not protrude substantially into the air flowing past the aileron while the aileron is deflected to angles within a control range of angles. This allows for strong positive control of the rotation of the rotor. When the aileron is rotated to angles within a shutdown range of deflection angles, lift-destroying, turbulence-producing cross-flow of air through a flow gap, and turbulence created by the aileron, create sufficient drag to stop rotation of the rotor assembly.

The profile of the aileron further allows the center of rotation to be located within the envelope of the aileron, at or near the centers of pressure and mass of the aileron. The location of the center of rotation optimizes aerodynamically and gyroscopically induced hinge moments and provides a fail safe configuration.

8 Claims, 13 Drawing Sheets

OTHER PUBLICATIONS

Corrigan et al., "Performance Tests on the Mod–O Wind Turbine with Aileron Control Surfaces", NASA Wind Energy Project Office, Lewis Research Center, Cleveland, OH, May 8, 1984.

Cao et al., "Performance and Aerodynamic Braking of a Horizontal–Axis Wind Turbine from Small–Scale Wind Tunnel Tests", NASA Lewis Research Center, Jul., 1987.

Savino et al., "Reflection Plane Tests of a Wind Turbine Blade Tip Section with Ailerons", NASA, Langley Research Center, Hampton, VA, Aug., 1985.

Miller et al., "Summary of MASA/DOE Aileron–Control Development Program for Wind Turbines", NASA Lewis Research Center, Cleveland, OH pp. 537–545.

Gregorek et al., "Comparison of Pressure Distributions on Model and Full–Scale MACA 64–621 Airfoils with Ailerons for Wind Turbine Application", NASA, Lewis Research Center, Apr. 1988.

Miller et al., "Aileron Controls for Wind Turbine Applications", NASA, Lewis Research Center, Aug., 1984.

Miller et al., "Brake Augmented Shutdown Analysis of the Mod–O with a 38% Chord Aileron–Control Rotor", NASA, Lewis Research Center, Cleveland, OH, Mar. 27, 1985.

Miller et al., "Analytical Model for Predicting Emergency Shutdown of a Two–Bladed Horizontal Axis Wind Turbine", NASA, Lewis Research Center, Jun., 1983.

Wentz et al., "Feasibility Study of Aileron and Spoiler Control System for Large Horizontal Axis Wind Turbines", NASA, Lewis Research Center, May 1980.

Wentz et al., "Wind Tunnel Tests of Spoilers and Ailerons for Wind Turbine Power Control and Braking", Sandia Wind Turbine Aerodynamics Seminar, Mar. 1985.

Cao et al., "Performance and Aerodynamic Braking of a Horizontal–Axis Wind Turbine from Small–Scale Wind Tunnel Tests", Wind Energy Report No. 37, NASA, Lewis Research Center, Jul., 1985.

Miller et al., "Summary of 38 Percent Chord Aileron–Control Rotor Tests", NASA, Lewis Research Center, Fourth ASME, 1985.

Miller et al., "Analytical Model for Predicting Emergency Shutdown of a Two–Bladed Horizontal Axis Wind Turbine", NASA, Lewis Research Center, Sixth Biennial wind Energy Conference and Workshop, pp. 803–813.

Brockehurst, "Aerodynamic Control of Horizontal Axis Wind", BWEA, 1988, pp. 173–179.

(HYPOTHETICALLY MODIFIED PRIOR ART)

(HYPOTHETICALLY MODIFIED PRIOR ART)

5,527,151

ADVANCED WIND TURBINE WITH LIFT-DESTROYING AILERON FOR SHUTDOWN

The government has rights-in this invention pursuant to Subcontract No. ZA-2-11295-2 awarded by the United States Department of Energy to the National Renewable Energy Laboratory.

This application is a continuation-in-part of a copending application entitled "Advanced Wind Turbine With Lift-Cancelling Aileron for Shutdown" Ser. No. 206,867 and filed Mar. 4, 1994 by the same inventors as in the present application, which is incorporated by reference.

BACKGROUND OF THE INVENTION

The invention relates to wind turbines.

Over the past several years, there has been much research and development in the field of wind turbine-based electrical power generation. As the size and power generating capabilities of wind turbines have increased, the need for reliable control capabilities has increased accordingly. Specifically, the ability to compensate for varying wind conditions—from the ground to the top of the rotor assembly as well as from one point in time to the next—is highly desirable. The ability to shut down the rotor in the event the power load on the rotor is suddenly lost, to prevent catastrophic overspeed of the rotor, is critical.

Some prior wind turbine configurations have used pitch control schemes wherein the pitch of the entire rotor blade is varied. Other configurations have incorporated spoilers or ailerons at the trailing edges of the rotor blades. The spoilers or ailerons extend for a portion of the span of each rotor blade, typically near the outer end of the blade.

As shown in FIGS. 1A and 1B, a typical wind turbine assembly includes a rotor assembly 10 mounted to a gearbox assembly 12, which is in turn supported at the top of a tower structure 14. Through any of a variety of mechanisms known in the art, the combined rotor/gearbox assembly is rotated about the tower 14 such that the rotor faces into the oncoming free-stream wind. The free-stream wind is represented by the velocity vector $V_w$, which faces into the page in FIG. 1B. The rotor assembly 10, which may in some instances be constructed with a coning angle $\Delta$, typically has two or three rotor blades 20.

As shown in FIG. 2, the free-stream wind strikes the high pressure surface 22 of rotor blade 20 and is deflected towards the trailing edge 24 as indicated by curved arrows 25. The force of the air being deflected causes the rotor assembly 10 to begin rotating at an angular frequency $\Omega$, and the tangential velocity $V_\Omega$ at any radial position r along the rotor blade 20 is equal to $r\cdot\Omega$. The rotor blade "sees" a local relative wind, represented by the velocity vector $V_{rel}$ which is equal to the sum of the local tangential velocity $V_\Omega$ and the free-stream wind velocity $V_w$, which strikes the rotor blade 20 at a local angle of attack $\alpha$. It will be appreciated that, for a given free-stream wind velocity $V_w$ and angular frequency $\Omega$, the tangential velocity $V_\Omega$ and, hence, local relative wind and local angle of attack $\alpha$ will vary along the length of the rotor blade 20.

As the rotor blade 20 moves through the air, with a local relative wind having velocity $V_{rel}$ at any given position r, lift L is generated normal to the local relative wind. The lift L has a component $L\cdot\sin(\theta)$ in the direction of rotation, where $\theta$, the relative wind angle, is equal to the local angle of attack $\alpha$ plus the local pitch or twist angle $\phi$, the angle between the chord line 26 and the plane of rotation 16. Drag D, parallel to the local relative wind, has a component $D\cdot\cos(\theta)$ opposite the direction of rotation. The net aerodynamic force in the direction of rotation, referred to as the suction force S and equal to $L\cdot\sin(\theta)-D\cdot\cos(\theta)$, imparts a torque on the rotor assembly 10. The angular velocity $\Omega$ will increase, under the influence of the torque, until the suction force S is balanced by retarding forces, e.g., power load and friction.

As noted above, the use of ailerons at the trailing edge of the rotor blades has been investigated for regulating the performance of wind turbines. The ailerons are located at the outer region of the rotor blade and typically have a length on the order of 30% of the total blade length. Configurations previously tested, as illustrated in FIGS. 3A, 3B, 3C, and 3D, have typically employed ailerons 32 which are little more than discrete, segmented portions of the rotor blade 20 itself. These ailerons, usually comprising about 20% to 38% of the total rotor blade chord, have been hinged to the main section 34 of the rotor blade 20 along the low pressure surface 28. They have often been attached via a hinge 36 located right at the leading edge 38 of the aileron 32, as shown in FIGS. 3A and 3B. Alternatively, in other configurations as shown in FIGS. 3C and 3D, the hinge 36 has been mounted at the end of an extension plate 40 such that a flow gap 41 is formed between the aileron 32 and the main section 32 of the rotor blade 20 as the aileron 32 is rotated. The flow gap 41 allows air to flow from the high pressure surface 22 of the rotor blade to the low pressure surface 28 of the rotor blade.

In both of these configurations, deflection of the aileron 32 changes the lift generated by the rotor blade by modifying the camber of the rotor blade 20 and, especially where the configuration provides a flow gap 41, by disrupting the airflow over the low pressure surface 28. Additionally, deflection of the aileron 32 increases drag on the rotor blade 20. Given a large enough deflection, the aileron 32 can be used to slow substantially the rotation of the rotor assembly 10. It has not previously been possible, however, to stop the rotation entirely using just ailerons, as the negative suction force generated by the outer, aileron portion of the blade has been insufficient to overcome the positive suction force generated over the non-aileron sections of the blade.

Furthermore, where the hinge 36 is located along the low pressure surface 28, either at or slightly behind the leading edge 38 of the aileron, deflecting the aileron 32 moves the center of mass of the aileron transverse to the direction of rotation of the rotor blade 20. For a large scale wind turbine, i.e., one having a rotor diameter on the order of sixty feet or more, rotating at a frequency $\Omega$ on the order of fifty revolutions per minute or more, gyroscopically induced moments on the aileron 23 can be quite large. These moments lead to excessive "wear and tear" on the hinge 36, as well as on the actuation mechanism used to deflect the aileron 32.

SUMMARY OF THE INVENTION

The invention provides a wind turbine rotor configuration which employs ailerons to regulate as well as shut down rotation of the rotor. The mounting arrangement optimizes hinge moments, thereby reducing the size and weight of the actuator assembly required and wear and tear on the component parts.

In preferred embodiments, a rotor assembly has a blade with a main section and an aileron which rotates, relative to the main section, about a center of rotation located within the envelope of the aileron. The aileron has a surface which extends at an angle from a lower surface of the aileron to a nose region at an upper, forward portion of the aileron.

The shape allows the aileron to rotate about the center of rotation, through a control range of angles, without protruding substantially into the air flowing past the aileron. Thus, the aileron provides strong positive control over the rotation of the rotor assembly when the aileron is deflected to angles within a control range of angles.

The nose of the aileron and the trailing edge of the main portion of the blade are shaped and positioned to fit together closely. This prevents premature cross-flow of air, from one side of the blade to the other, while the aileron is deflected to angles within a control range of angles. When the aileron is rotated to angles within a shutdown range of angles, a flow gap opens which allows air to pass from the high pressure side of the rotor blade to the low pressure side of the rotor blade. This desired shutdown cross-flow enhances boundary layer separation from the main section of the blade. The trailing edge of the aileron increases the boundary layer separation, as well as causing downstream, drag-enhancing turbulence. The nose region also causes downstream, drag-enhancing turbulence. Drag created thereby is sufficient to stop rotation of the rotor assembly.

The center of rotation is located within the envelope of the aileron, at or near the centers of pressure and mass of the aileron. The location of the center of rotation optimizes aerodynamically and gyroscopically induced hinge moments and provides a fail safe configuration.

DESCRIPTION OF THE PREFERRED EMBODIMENTS

Figure 1A:
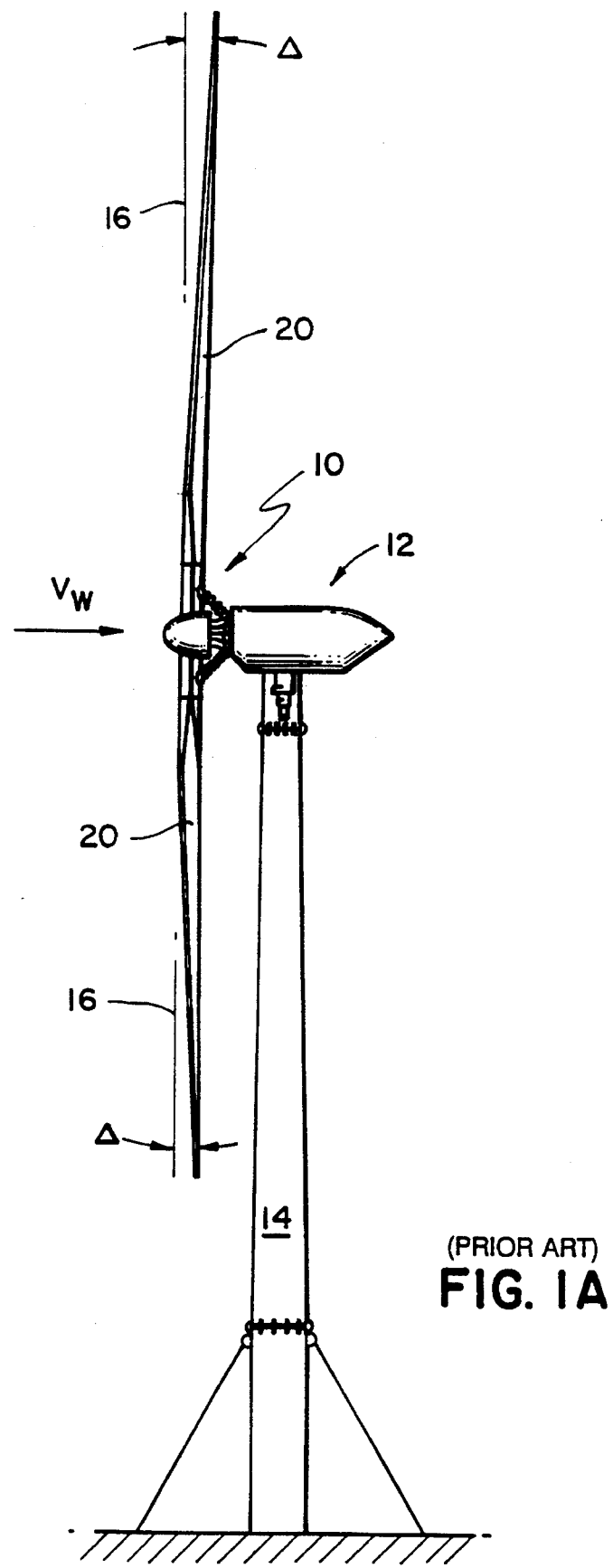
FIGS. 1A and 1B are side and downwind views of a typical wind turbine.
Figure 1B:
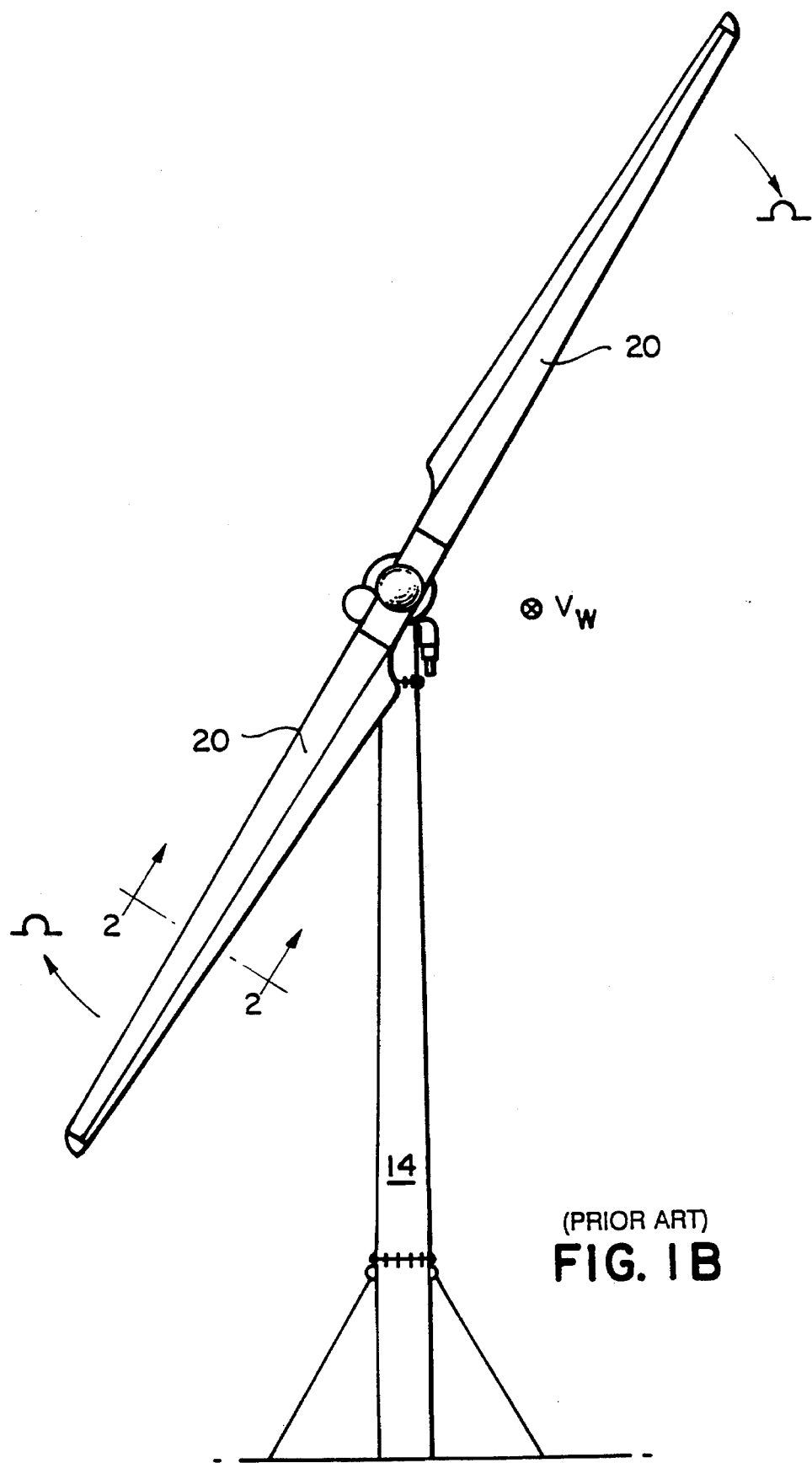
Figure 2:
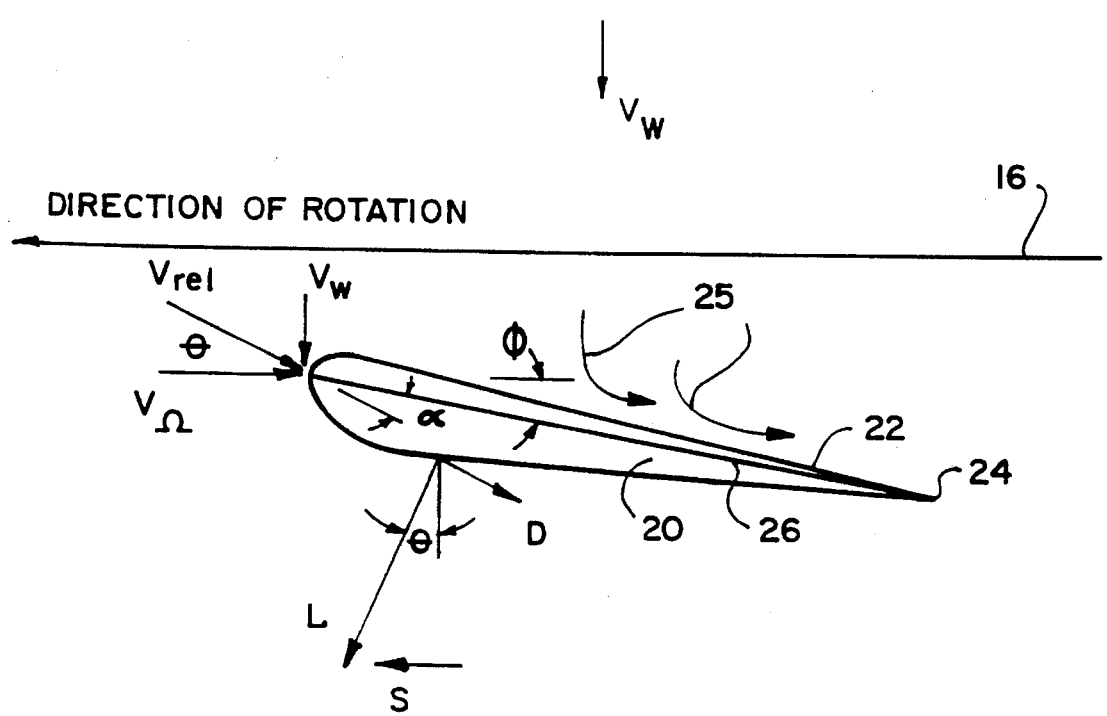
FIG. 2 is a section view of a wind turbine rotor blade, taken along line 2—2 of FIG. 1, showing the generation of aerodynamic forces on the rotor blade.
Figure 3A:
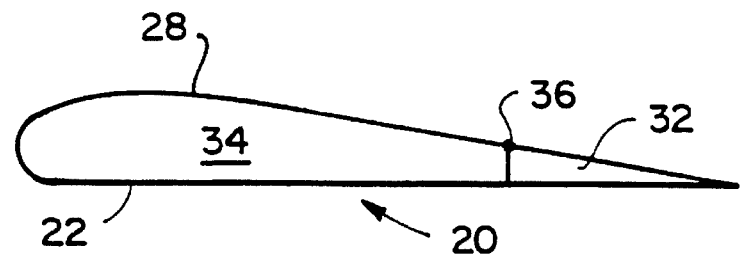
FIGS. 3A, 3B, 3C, and 3D are section views of wind turbine rotor blades with ailerons as previously employed within the art.
Figure 3B:
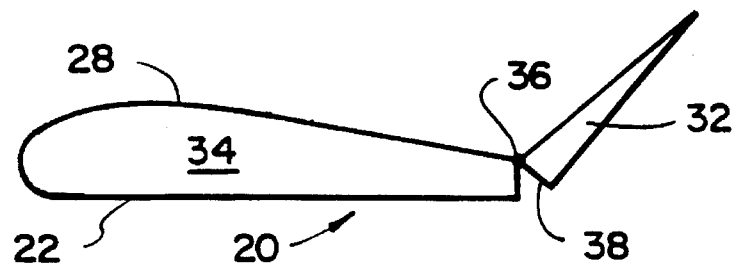
Figure 3C:
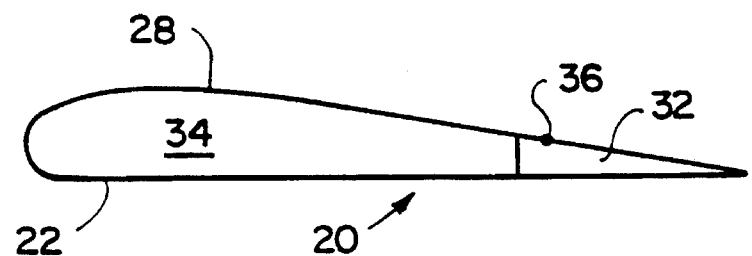
Figure 3D:
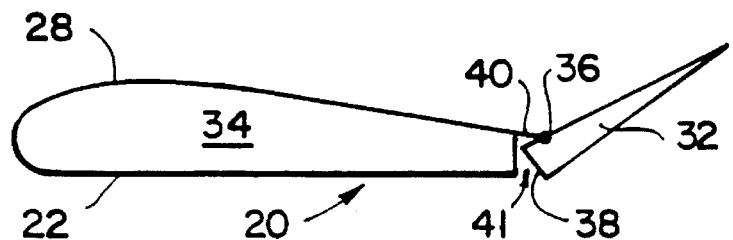
Figure 4:
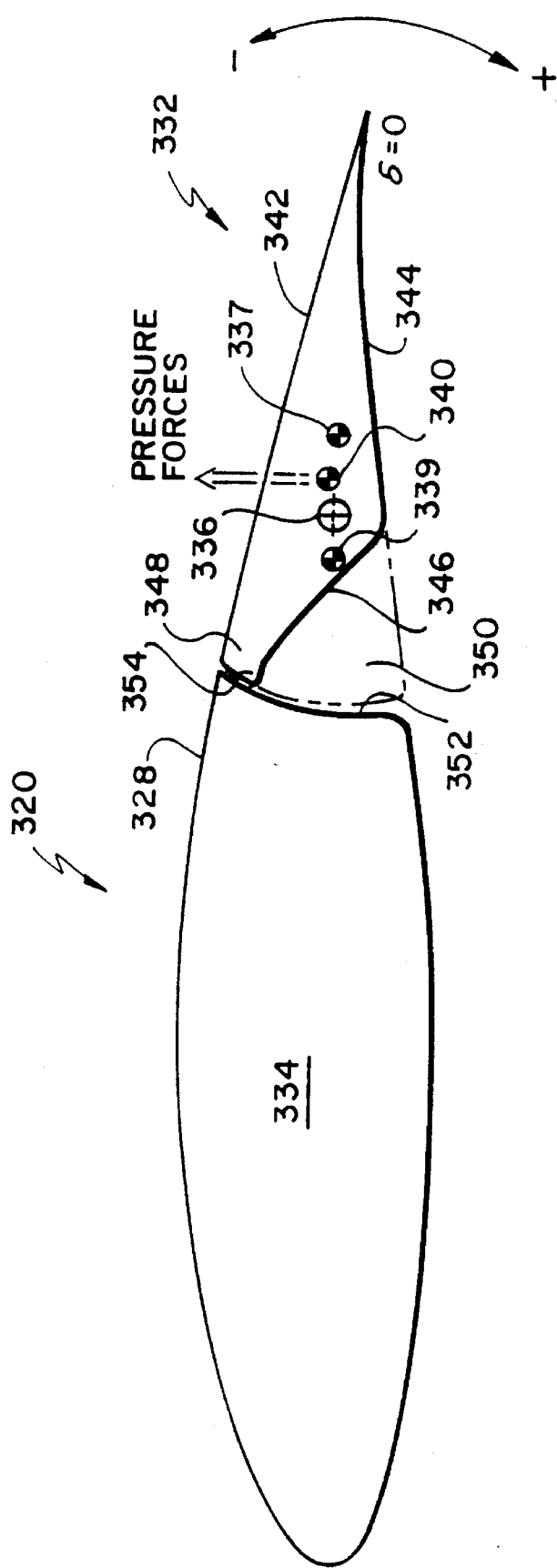
FIG. 4 is a section view of a rotor blade and aileron according to the invention.

According to the invention, as shown in FIG. 4, a rotor blade 320 has a main section 334 and an aileron 332 which is designed to produce extreme drag on the rotor when deflected beyond a certain deflection angle $\delta$. Currently, a NACA $64_3618$ profile is preferred for the main section 334. The aileron 332 constitutes about 40% of the overall chord of the rotor blade 320, and runs from about the 68% radial position to about the 98% radial position.

The aileron 332 can be mounted to the main section 334 of the rotor blade with a trunnion and pivot arm hinge assembly as described in U.S. Pat. No. 5,320,491, issued to Coleman et al. on Jun. 14, 1994, which is incorporated by reference. The hinge assembly should be constructed such that the center of rotation 336 of the aileron, i.e., the hingeline, is located inside the "envelope" of the aileron 332. Chordwise, the center of rotation could be located from about the ten to about the fifty percent chord point. Preferably, the center of rotation 336 is located from about the twenty-five to about the thirty-five percent chord point. The center of mass 337 of the aileron, or a position slightly behind the aerodynamic center 339 of the aileron, is usually an optimal location.

The center of rotation 336 may be located anywhere between the upper surface 342 and the lower surface 344. It is preferable, however, for the center of rotation 336 to be positioned vertically as close to the center of mass 337 of the aileron as possible.

The shape of the aileron 332 and the location of the center of rotation 336 work synergistically to yield enhanced aileron performance. The location of the center of rotation 336 optimizes hinge forces and moments. If the center of rotation 336 is at or near the center of mass 337 of the aileron, gyroscopic moments, induced when moving the center of mass 337 of the aileron transverse to the plane of rotation of the rotor assembly, will be substantially reduced or eliminated.

As the aileron is deflected, the location of the center of pressure 340 varies. Locating the center of rotation 336 so that, while the aileron moves within the control range of angles the center of pressure remains at or near the center of rotation—i.e., substantially balancing pressure forces fore and aft of the center of rotation 336—reduces reduces hinge moment and hence actuation forces required to rotate the aileron.

Ideally, the center of rotation 336 should be located so as to remain slightly ahead of the center of pressure 340. This provides a fail-safe configuration in that, should power be lost in the aileron actuation system, the aileron 332 will rotate in the negative direction, sharply reducing the suction force and preventing an overspeed condition.

It is the shape of the aileron that makes it possible to locate the center of rotation 336 inside the envelope of the aileron, with the attendant benefits described above, while using the aileron 332 for strong, positive control function. Strong positive control function refers to the ability of the aileron 332 to adjust the lift and drag on the rotor blade 320 smoothly, continuously, and predictably through a large range of deflection angles $\delta$ as exemplified in FIGS. 5 and 6. As wind and rotor speed conditions change, and hence the angle of attack $\alpha$, the aileron 332 is deflected so as to "move" the rotor blade 320 "onto" another lift and drag curve, thereby maintaining control of the rotor assembly by controlling lift, drag, and hence suction. It is essential that the lift and drag curves, for varying deflection angles $\delta$, be smoothly continuous. Otherwise, predictable control of the rotor assembly is not possible.

Figure 7A:
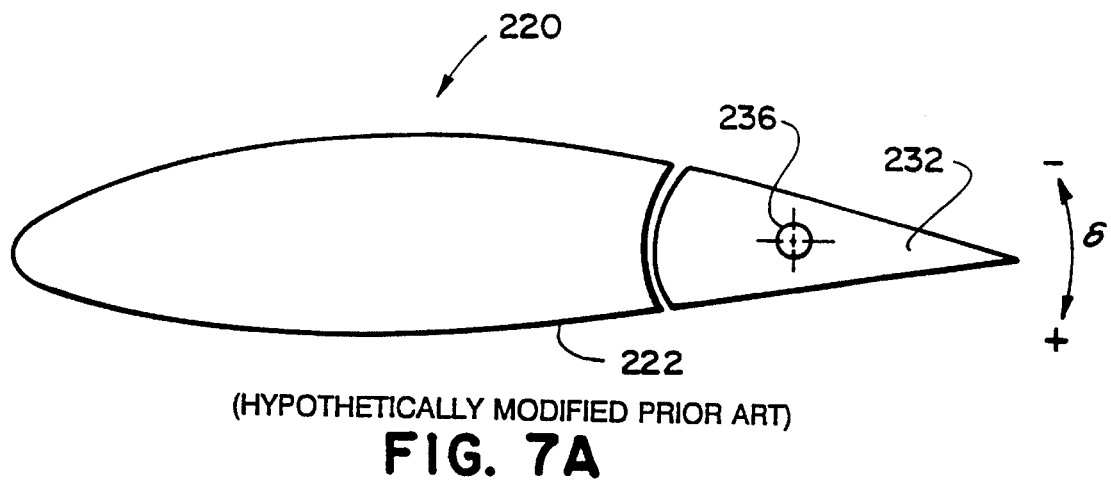
FIGS. 7A and 7B are section views of a prior rotor blade/aileron configuration hypothetically modified to have the hinge configuration of the present invention.
Figure 7B:
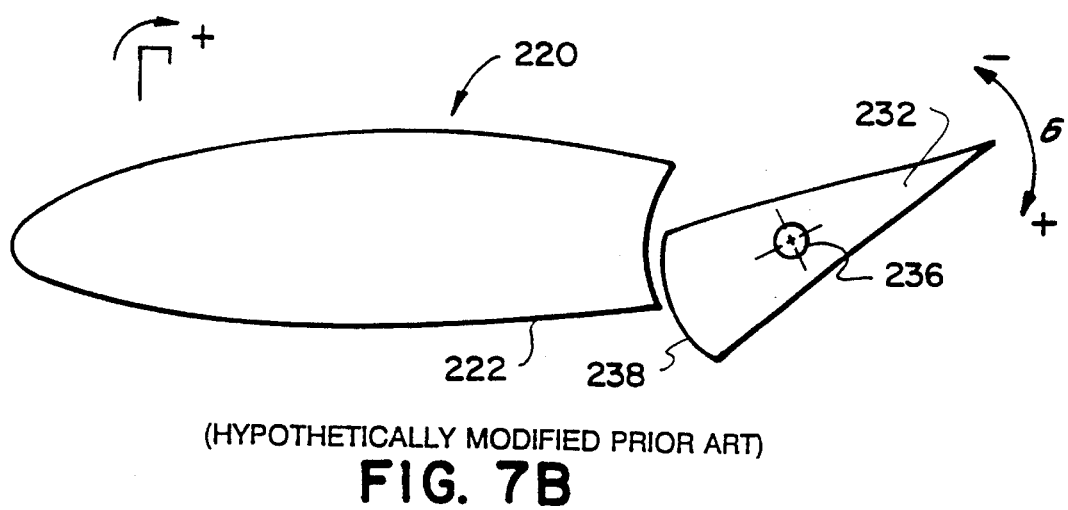

Were a conventional, rotor-segment type aileron 232 to be mounted on a hinge 236 located within the envelope of the aileron 232, as shown in FIG. 7A, any negative deflection of the aileron 232 would cause the nose 238 of the aileron to protrude into the airstream flowing along the high pressure surface 222 of the rotor blade 220, as shown in FIG. 7B. The protruding nose 238 would create a back pressure on the high pressure side of the rotor blade 220 which would add a positive component to the circulation F about the rotor blade. The positive component of circulation F would serve to increase lift—a result opposite that desired—and would make changes in lift and drag with changes in deflection angle δ less predictable. Control of the rotor assembly would therefore be far more difficult to maintain. (Positive deflections of the aileron would exhibit similar confounding effects on control.)

The profile of the aileron 332 substantially reduces or eliminates these backpressure effects. As is distinctly noticeable in FIG. 4, the front of the aileron includes an angled surface 346 which slopes upward from a location essentially below the center of rotation 336 towards the nose region 348 of the aileron. In essence, the bottom, front portion of the aileron, indicated with phantom lines, is "missing." This prevents the aileron from protruding into the airstream, as in FIG. 7B, as it is rotated through a large, control range of mostly negative deflection angles.

Figure 5:
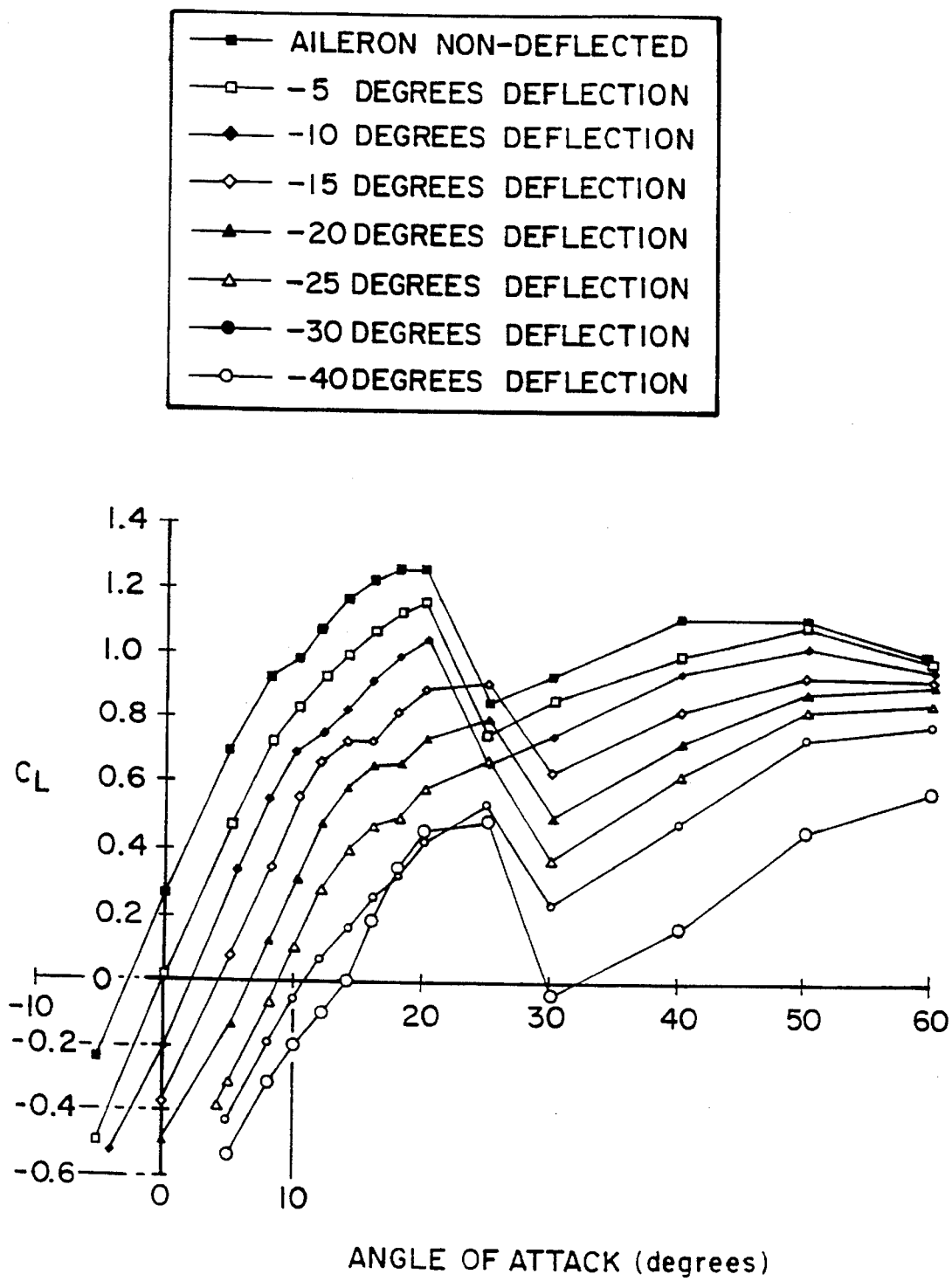
FIGS. 5 and 6 are graphs showing variation of lift and drag coefficients, as functions of angle of attack $\alpha$, for varying deflection angles $\delta$.
Figure 6:
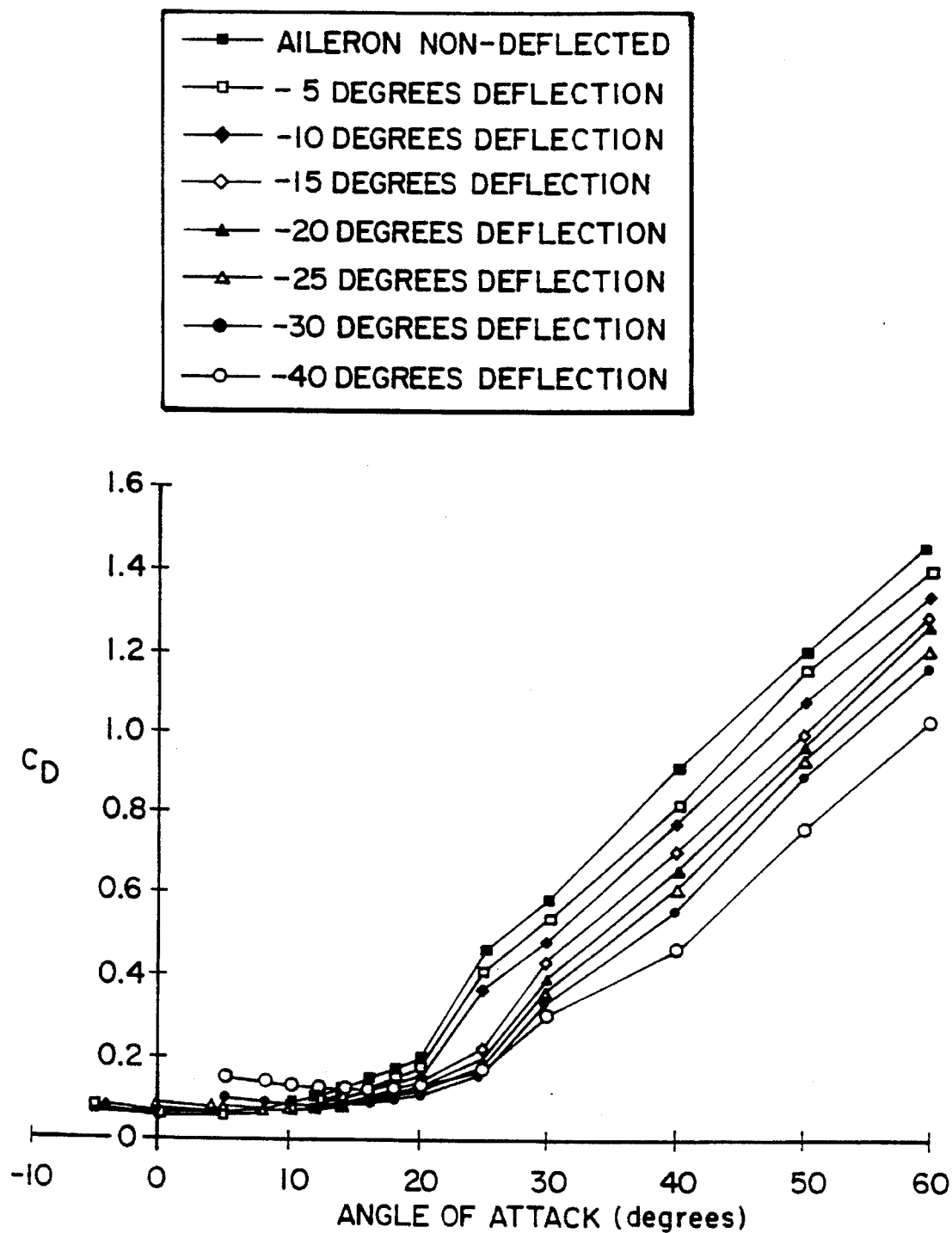
Figure 8A:
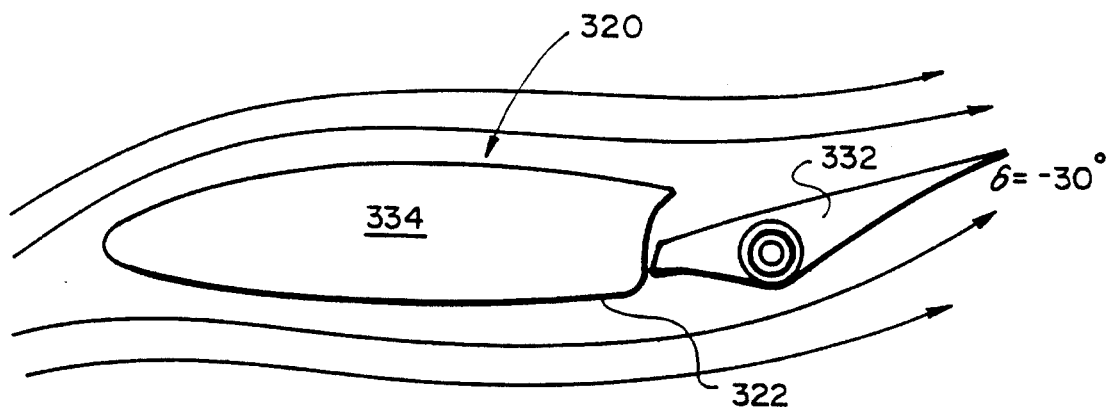
FIGS. 8A, 8B, 8C, and 8D are section views showing the aileron of the invention rotated through various deflection angles $\delta$, from the control range of angles to the shutdown range of angles.

Thus, as shown in FIG. 8A where the aileron 332 is rotated by 30° the high pressure surface 322 of the rotor blade remains relatively streamlined. As a result, the airflow substantially follows the contour of the rotor blade 320 and the rotor blade 320 "moves" smoothly from one lift or drag curve to the next, as shown in FIGS. 5 and 6, with changing deflection angle δ. This smooth progression enables predictable regulation of the rotor's performance, e.g., via a control scheme as described in the above cited U.S. application Ser. No. 07/911,215.

Although the nose region 348 of the aileron will protrude slightly above the low pressure surface 328 of the rotor blade upon positive deflection of the aileron positive deflections are generally not employed as often as negative deflections, and the magnitude of positive deflections are generally less than three degrees. Thus, slight protrusion of the nose region 348 of the aileron above the low pressure surface 328 is acceptable. Furthermore, it has been found that the "cove" 350 defined by the angled surface 346 of the aileron and the trailing edge 352 of the main section 334 of the rotor blade causes no appreciable degradation in performance of the aileron 332 or of the rotor blade 320 as a whole.

Figure 8B:
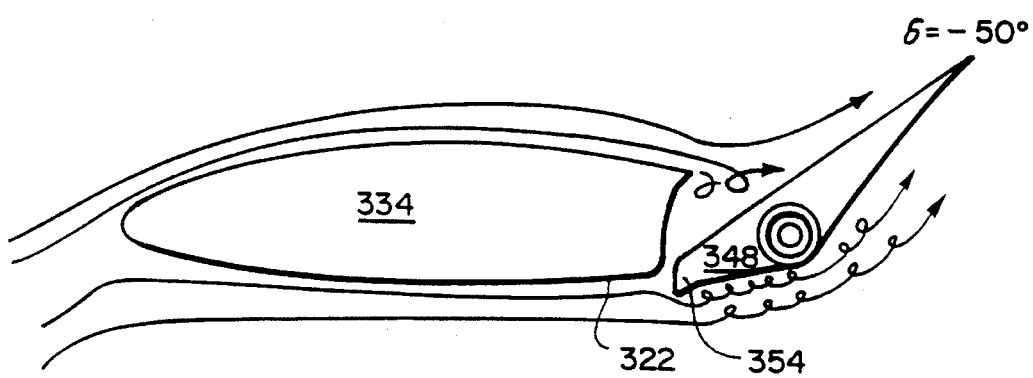

As the aileron is rotated beyond the control-range of deflection angles, e.g., beyond 40° it enters into a shutdown range of deflection angles, in which the shape of the aileron functions to increase drag on the rotor blade substantially. For example, as shown in FIG. 8B where the aileron is rotated by 50° the nose region 348 of the aileron starts to protrude into the airstream flowing along the high pressure surface 322. In particular, the V-shaped protrusion 354 at the front of the nose region provides a "sharp" contour which trips the flow and creates turbulence. The turbulent flow increases drag on the rotor blade, thereby decreasing the suction force on the rotor assembly.

Figure 8C:
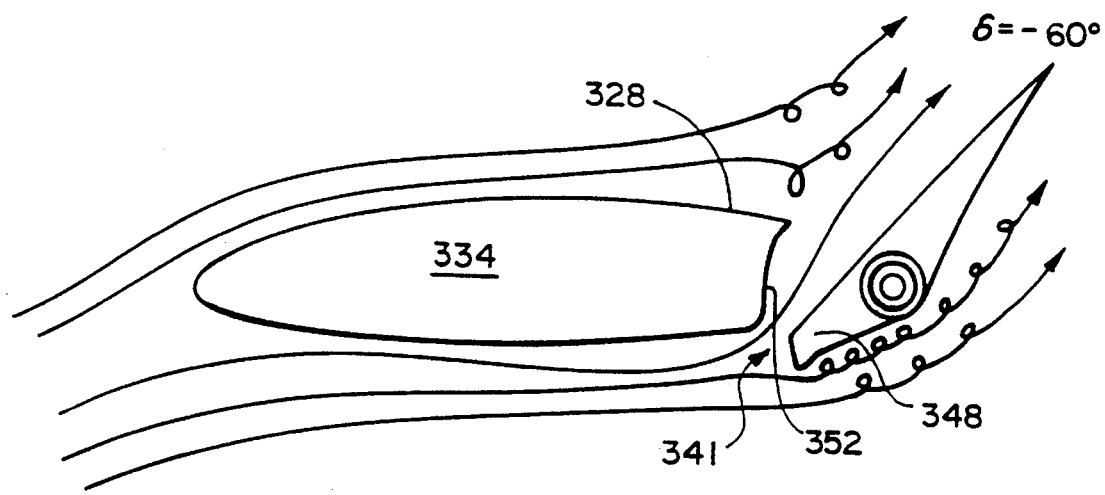

As the aileron is deflected even further, a flow gap 341 opens between the nose region 348 of the aileron and the trailing edge 352 of the main section (FIG. 8C). The flow gap allows air, diverted in part by the V-shaped protrusion, to flow from the high pressure side of the aileron to the low pressure side of the aileron. This "cross-flow" causes the boundary layer to separate from the low pressure surface 328 and reduces lift generated by the main section of the rotor blade. Boundary layer separation leads to separated flow along the low pressure surface 328, thereby increasing drag and further reducing suction on the rotor blade.

Figure 9A:
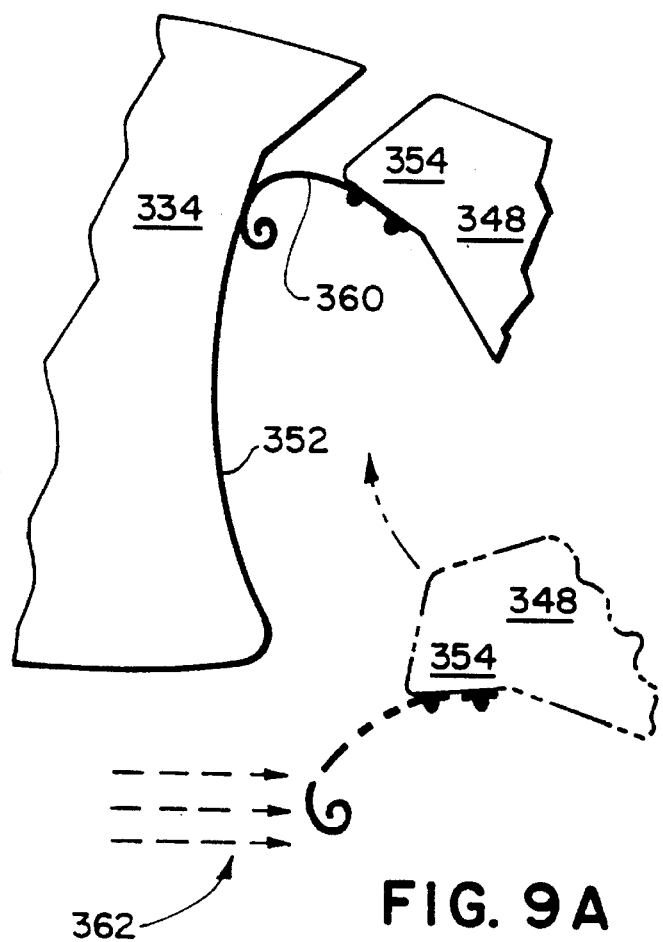
FIGS. 9A and 9B are partial section views showing devices to seal the flow gap between the aileron and the main section of the rotor blade.
Figure 9B:
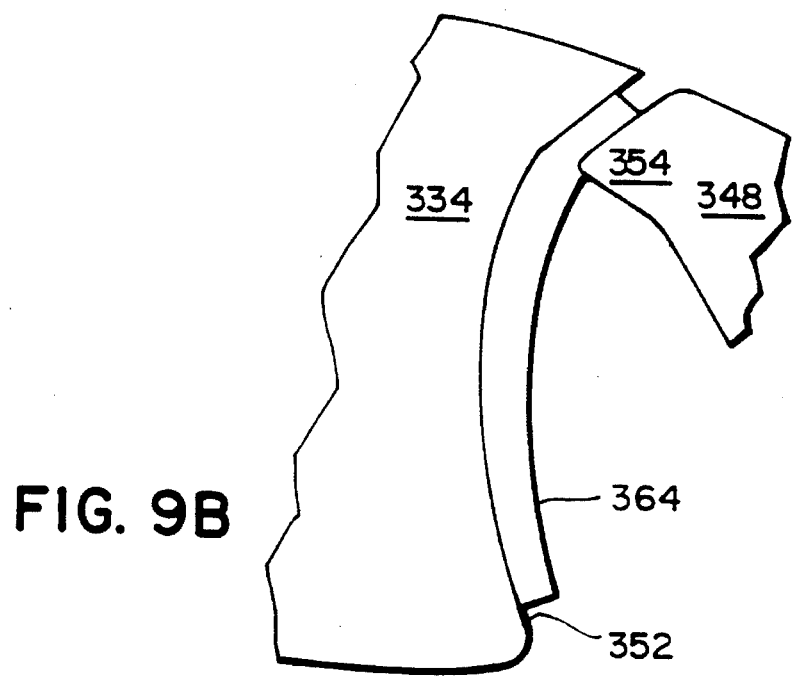

To prevent premature cross-flow through the flow gap, i.e., cross-flow while the aileron is within the control range of deflection angles, it may be desirable to provide a seal between the aileron and the main section of the rotor blade. As shown in FIG. 9A, a seal can be fashioned easily by attaching a resilient segment of coil spring metal or plastic 360 to the nose region 348 of the aileron. The coil spring segment should be rounded, as shown, to slide smoothly along the trailing edge 352 of the main section 334 of the blade. It should be elastically biased to maintain contact with trailing edge 352; flexible so as not to hinder movement of the aileron as it moves from a position outside the control range of angles (indicated in phantom) back to a position within the control range of angles where sealing is required; and rigid enough to withstand the airflow 362 to which it is exposed (indicated in phantom) when the aileron is deflected into the shutdown range of angles as well as the pressure differential between the high and low pressure sides of the blade when the aileron is in the control range of angles. Advantageously, the coil spring seal also creates drag, which help slow the rotor, when the aileron is rotated to shutdown positions. Other spring-biased sealing means can be used as well.

Alternatively, a layer of resilient material 364, e.g. rubber, can be attached to the trailing edge 352 of the main section of the rotor blade. The resilient material should be thick enough to seal against the V-shaped protrusion 354, yet not so thick as to preclude movement of the aileron. A layer of silicone or other slick material may be added to facilitate sliding of the V-shaped protrusion across the layer of resilient material.

Figure 8D:
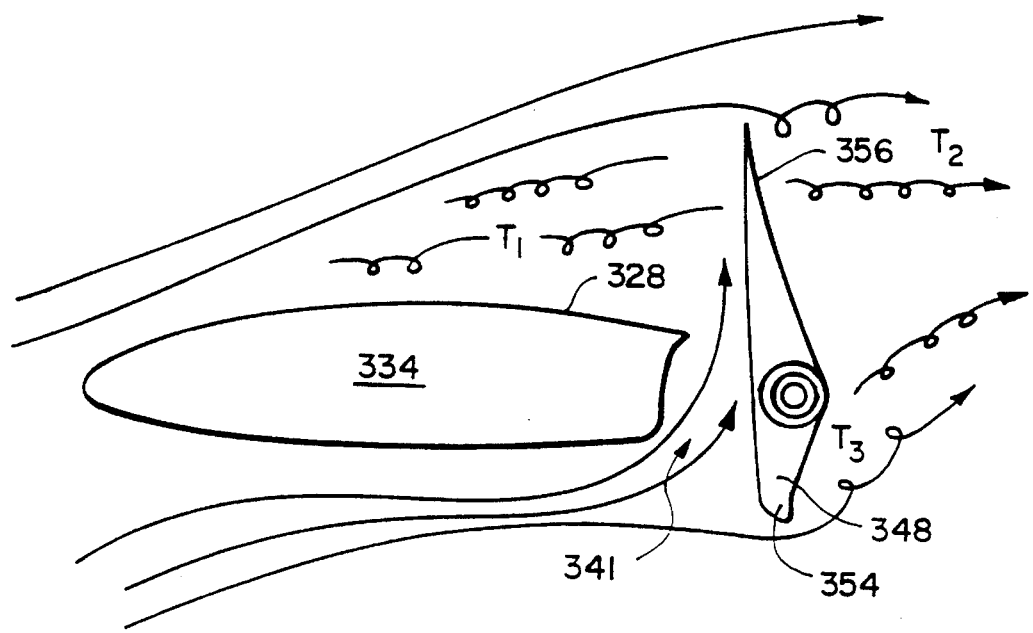

As the aileron is rotated even further to an optimal shutdown angle, e.g., 90° (FIG. 8D), the aileron creates enough drag to stop rotation of the rotor assembly completely. The flow gap 341 opens wide, allowing a substantial amount of flow from the high pressure side of the rotor blade to the low pressure side. This high volume cross-flow is extremely effective in causing lift-destroying boundary layer separation from the low pressure surface 328. Additionally, the trailing edge 356 of the aileron is relatively long and sharp so that it presents an insurmountable obstacle to the air flowing along the low pressure surface. In other words, the airflow can not negotiate its way around the trailing edge smoothly, and this enhances the flow separation. A large amount of turbulence $T_1$ is created on the low pressure side of the rotor blade as a result.

The long, sharp nature of the trailing edge of the aileron helps create turbulence $T_2$ on the downstream side of the trailing edge, and the V-shaped protrusion 354 of the nose region trip creates turbulence $T_3$ on the downstream side of the nose region 348. As a result, flow about the rotor blade becomes extremely turbulent and produces extreme drag—enough to cause sufficient negative suction to bring the rotor assembly to a stop.

In sum, when deflected into the shutdown range of angles, the aileron creates negative suction by greatly reducing lift on the main section of the rotor blade and by creating extreme drag. The lift reduction—a result of the boundary layer separating from the low pressure surface of the main section of the blade—is attributable to the cross-flow through the flow gap and the relatively long trailing edge of the aileron. The high drag is attributable to turbulence resulting from the boundary layer separation and from the inability of the airflow to negotiate the sharp contours of the aileron at both the nose and the trailing edge.

Thus, the suction force acting opposite the direction of rotation is maximized by reducing blade-generated lift and maximizing drag on the aileron. This is in contradistinction to the aileron configuration presented in the above cited parent of this application, in which the aileron itself generates lift with a component acting in the direction opposite the direction of rotation.

The present configuration may be preferable to that of the parent application where the capabilities of the aileron actuator are limited. It has been found that in some instances the aileron of the parent application creates so much lift, and hence hinge-moment, that the actuation capability of the actuator is exceeded.

Figure 10A:
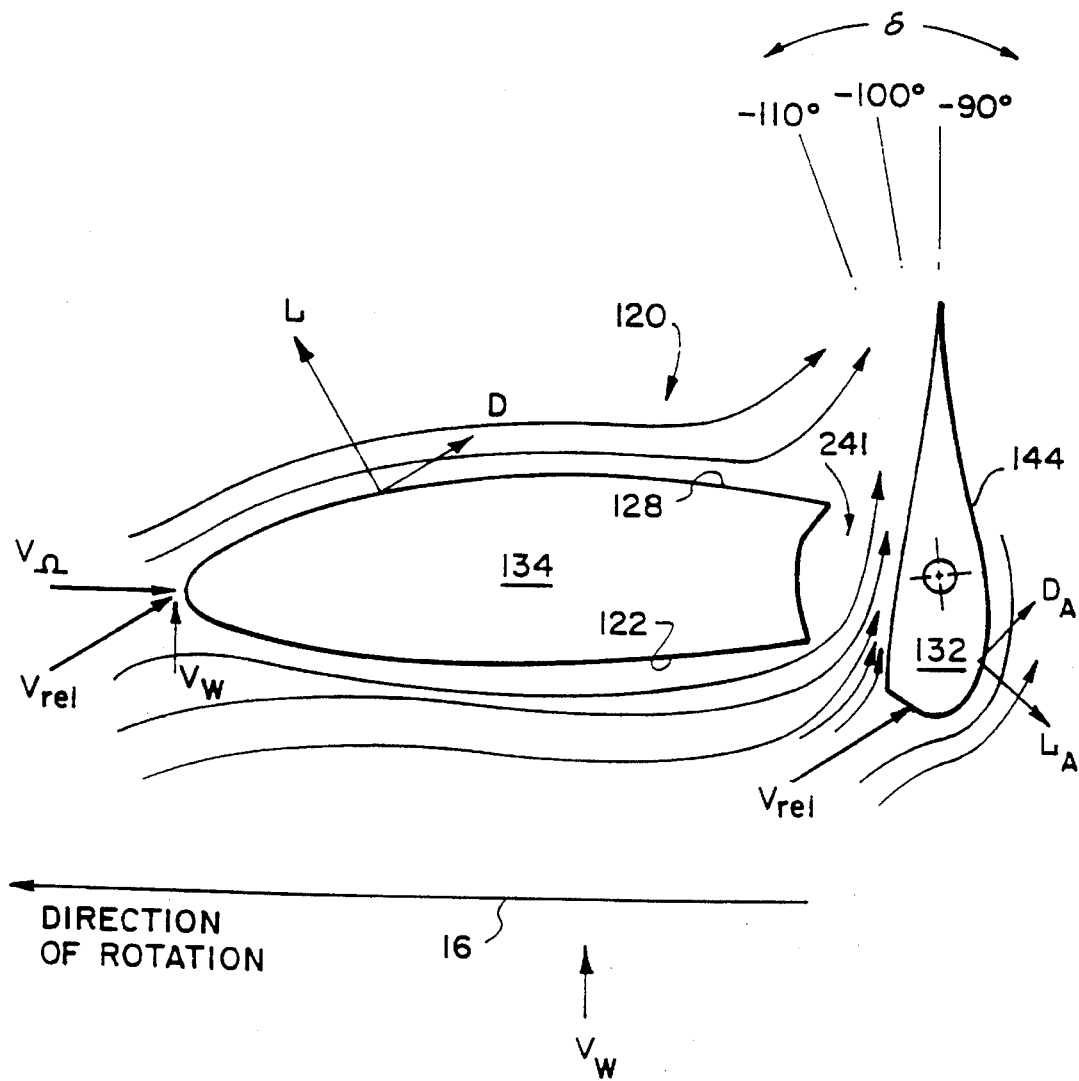
FIG. 10A is a section view of a rotor blade and aileron as taught in the parent of this application.
Figure 10B:
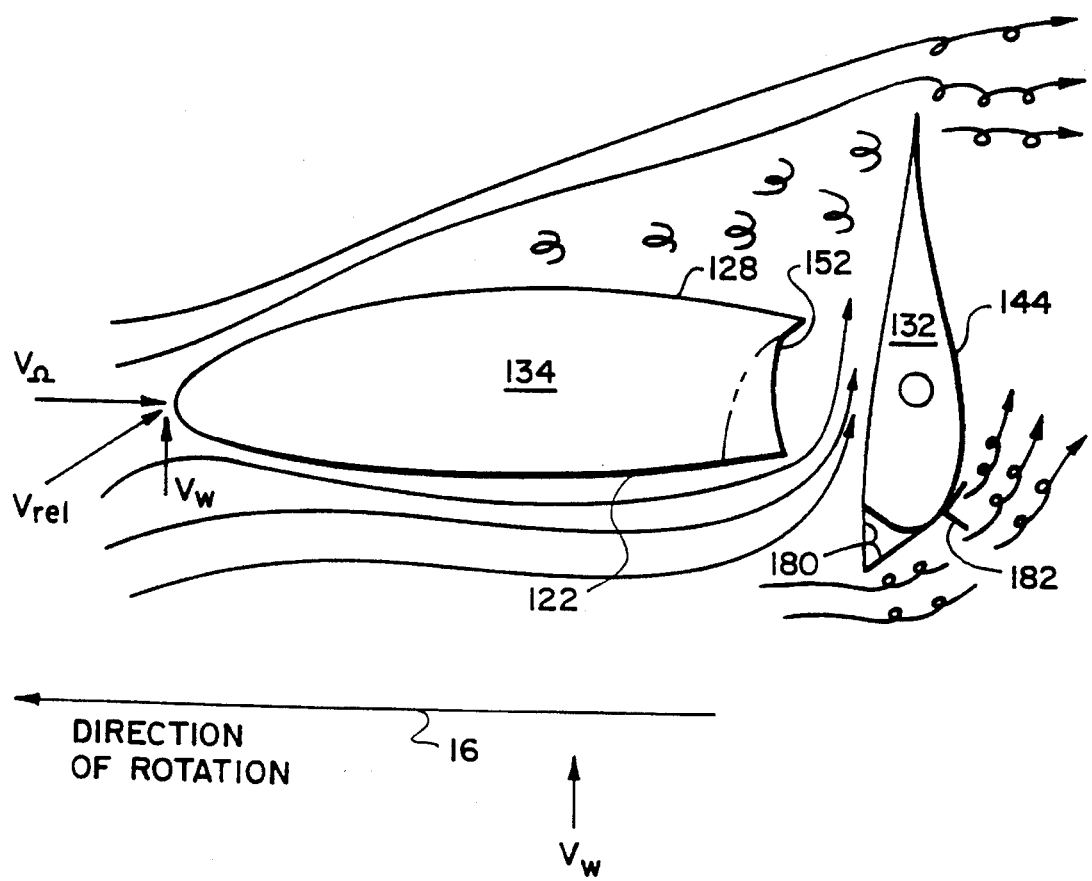
FIG. 10B is a section view showing modifications to the configuration of FIG. 10A.

If it is discovered that the actuator's capabilities are exceeded only after constructing a rotor assembly as taught in the parent, i.e., with a lift-generating aileron, the aileron can be modified with a simple retrofit to perform more like the aileron of the present application. As shown in FIG. 10A, the flow around the aileron must remain smooth and attached to the lift-generating surface 144 for aileron lift $L_A$ to be generated. This smooth, attached flow can be disrupted with an attachment that effectively produces a sharp nose radius, e.g., a length of angle iron 180 or other stiff, angled material on the nose of the aileron. Additionally or alternatively, a flow disrupting attachment, e.g., a length of angle iron 182 or other stiff, angled material can be attached to the lift-generating surface near the nose of the aileron (FIG. 10B). Depending on the original configuration, it may be necessary to remove material from trailing edge 152 of the main section 134 of the rotor blade, as indicated in phantom, to accommodate the angle iron 180 on the nose of the aileron.

While the aileron is within the control range of deflection angles, both pieces of angle iron remain tucked within the cove defined by the trailing edge 152 of the main section of the blade and the aileron, "hidden" from the airflow. When deflected into the shutdown range of angles, however, the angle iron trips the flow and causes drag-producing turbulent flow, much like the V-shaped protrusion 354 of the embodiment of FIG. 4.

What is claimed is:

1. A wind turbine rotor assembly comprising a rotor blade having a main section and a high pressure side, and an aileron rotatably connected to said main section via a hinge and rotating about a center of rotation, said center of rotation lying within the envelope of said aileron, wherein said aileron has a surface which extends at an angle from a lower surface of said aileron to a nose region at an upper, forward portion of said aileron, the shape of said aileron permitting it to rotate about said center of rotation, through a control range of deflection angles, without protruding substantially into air flowing past said high pressure side.

2. The rotor assembly of claim 1 wherein said main section has a trailing edge and deflection of said aileron to a deflection angle within a shutdown range of angles opens a flow gap which allows air to flow from a high pressure side of said rotor blade to a low pressure side of said rotor blade, said flow gap partially defined by said trailing edge of said main section.

3. The rotor assembly of claim 1 wherein said main section has a trailing edge and said trailing edge and side angled surface define a cove along an undersurface of said rotor blade.

4. The wind turbine rotor assembly of claim 1, further comprising a sealing member disposed between said main section and said aileron, wherein said sealing member prevents flow of air from said high pressure side of said rotor blade to a low pressure side of said rotor blade when said aileron is deflected to angles within said control range of deflection angles, and wherein deflection of said aileron to deflection angles within a shutdown range of angles opens a flow gap which allows air to flow from said high pressure side of said rotor blade to said low pressure side of said rotor blade.

5. The rotor assembly of claim 4 wherein said sealing member creates drag when said aileron is deflected to angles within said shutdown range of angles.

6. The rotor assembly of claim 4 wherein said sealing member comprises a coil spring segment attached to said aileron and biased to contact a trailing edge of said aileron when said aileron is deflected to angles within said control range of angles.

7. The rotor assembly of claim 4 wherein said sealing member comprises a layer of resilient material attached to a trailing edge of said aileron, said resilient material contacting said aileron when said aileron is deflected to angles within said control range of angles.

8. A wind turbine rotor assembly comprising a rotor blade having a main section, and an aileron rotatably connected to said main section via a hinge and rotating about a center of rotation, said center of rotation lying within the envelope of said aileron, wherein said aileron has a profile which permits strong positive control of said rotor assembly when said aileron is deflected to angles within a control range of deflection angles, and said profile provides for shutdown of said rotor assembly by increasing drag on said rotor blade when said aileron is deflected to angles within a shutdown range of angles.

* * * * *